Figure 1:
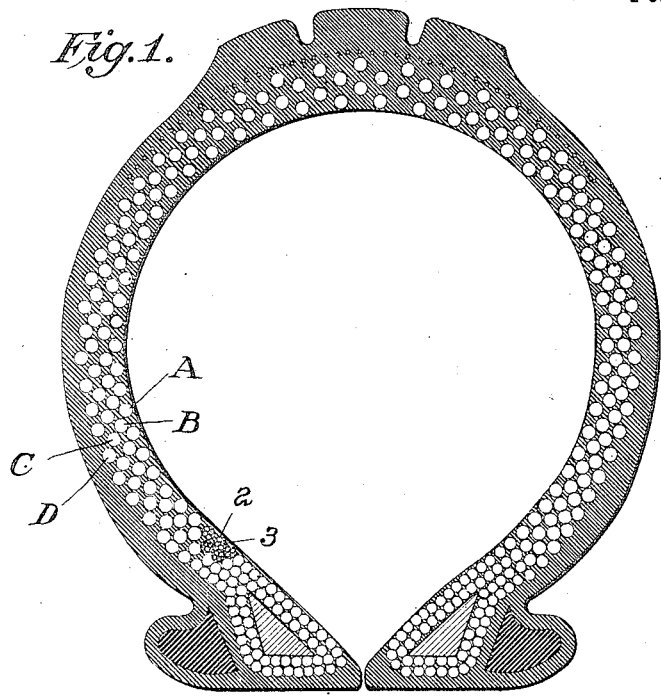

W. R. DENMAN.
METHOD OF BUILDING CORD TIRE CASINGS.
APPLICATION FILED NOV. 17, 1915.

1,210,434.

Patented Jan. 2, 1917.
2 SHEETS—SHEET 1.

Inventor:
Walter R. Denman,
by Spear, Middleton, Donaldson & Spear
Atty's.

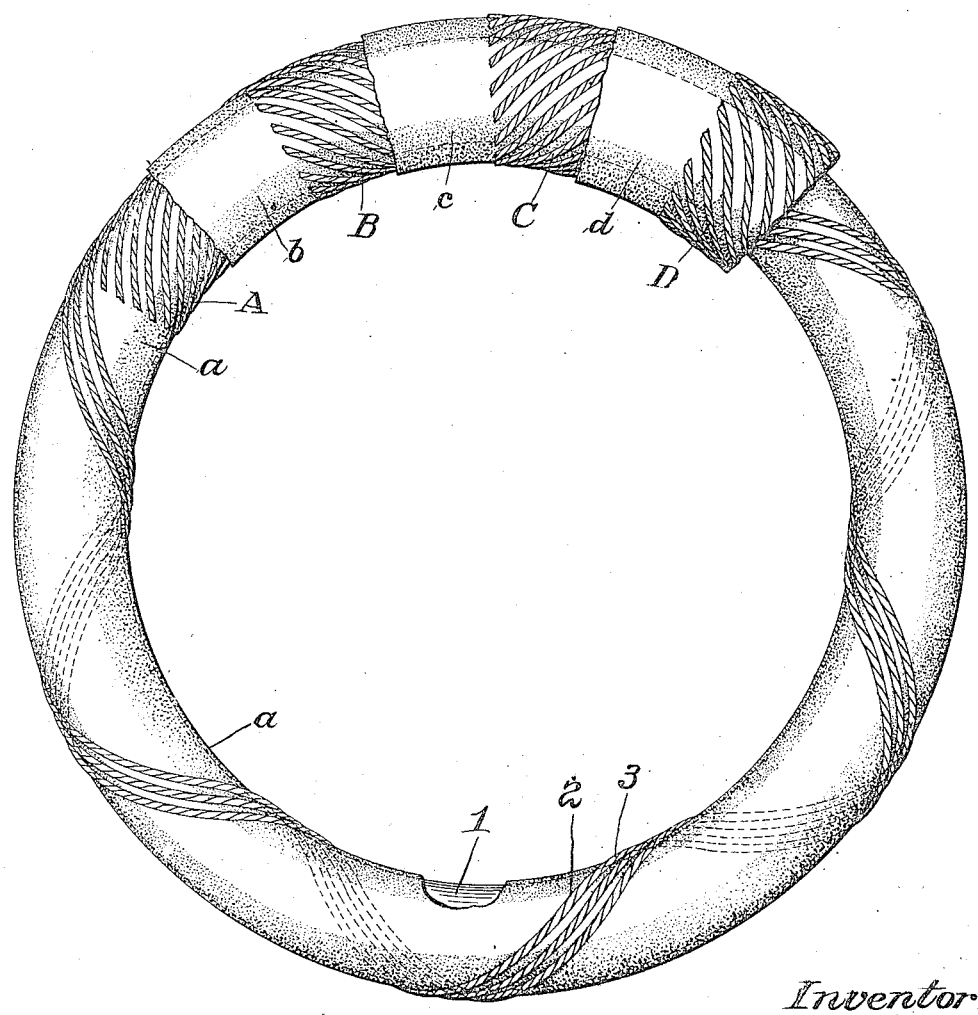

UNITED STATES PATENT OFFICE.

WALTER R. DENMAN, OF AKRON, OHIO, ASSIGNOR TO MILLER RUBBER CO., OF AKRON, OHIO, A CORPORATION OF OHIO.

METHOD OF BUILDING CORD TIRE-CASINGS.

1,210,434.      Specification of Letters Patent.      Patented Jan. 2, 1917.

Application filed November 17, 1915. Serial No. 62,035.

*To all whom it may concern:*

Be it known that I, WALTER R. DENMAN, a citizen of the United States, residing at Akron, Ohio, have invented certain new and useful Improvements in Methods of Building Cord Tire-Casings, of which the following is a specification.

The present invention relates to improvements in the manufacture of pneumatic tire shoes or casings and pertains more particularly to the type of casings formed upon a cord carcass.

The invention has for its principal object the construction of a tire shoe which will possess exceptional wearing qualities and which will at the same time be of a very flexible character.

Cord carcasses for tire casings have been formed by winding spirally a number of layers of flexible rubber treated cords about a circular ring core, slitting the carcass along its inner circumference, and removing it to a second core upon which the complete casing is built by the addition of the sides, beads and tread portions.

The present invention contemplates improvements in the method of building cord tire casings of this particular type and consists in providing certain novel features therefor.

It has been proposed to form the inner cord carcass by using a hollow, rubber impregnated cord of a sufficiently large size that two plies only of such cords laid transversely of the casing were sufficient. Where cords of these dimensions have been used it has also been customary to flatten the hollow cords of each ply along the apex or tread portion of the casing in order to fill up the spaces which existed between the individual cords due to the difference between the inner and outer circumference of the ring core upon which the cord carcass is built. It has previously been considered a disadvantage to permit these intervening spaces between the cords to remain unfilled, except by the excess of rubber which was formerly pressed into them by the flattening process. Furthermore the only way in which this intermediate layer of rubber could be obtained due to the large diameter of the cords used was to first coat the ring core with an envelop of rubber; then wind on the first cord ply; surround that by a second coating of rubber; wind on the second cord ply and subsequently by the use of pressure force the desired quantity of excess rubber into the intervening spaces. This process entailed the use of a specially designed hollow cord and was more or less dependent upon the subsequent flattening step for its success.

The present invention contemplates a much simpler and more economical method of constructing cord casings in which no specially prepared hollow cord is required and in which the formed flattening process can be entirely dispensed with.

The invention, rather than seeking to prevent the occurrence of intermediate portions of rubber between the cords at the tread surface of the casing, seeks to build up on the core a cord fabric with regular well defined rubber strips alternately disposed between the individual cords. It has been found that the best results are obtained with openings between the individual cords equal to between 60% and 70% of the diameter of the cord. Experience has shown that by using a cord of much smaller dimensions than the large hollow cord, a casing can be formed having an inner carcass composed of a number of superimposed plies of cords. The number of plies used is not necessarily fixed, but where it was previously the practice to employ two plies of hollow cords, four plies of the present smaller cord can be used to advantage.

The cord selected for this improved casing consists simply of about four rubber impregnated threads or yarns twisted together to form a unit. No central rubber core is needed and no hollow bore is obtained. A further advantage which accrues from the use of this small solid cord is that it is not necessary to force the rubber in between the cords as the cords will embed themselves into the rubber during the winding process on the ring core. The use of four superimposed plies of cord, having the cords of the several plies laid alternately at reverse angles across the circumference of the tread forms a carcass possessing greater flexibility and one which would be as difficult for an obstacle to penetrate as a carcass composed of only two plies of larger cords.

Figure 2:
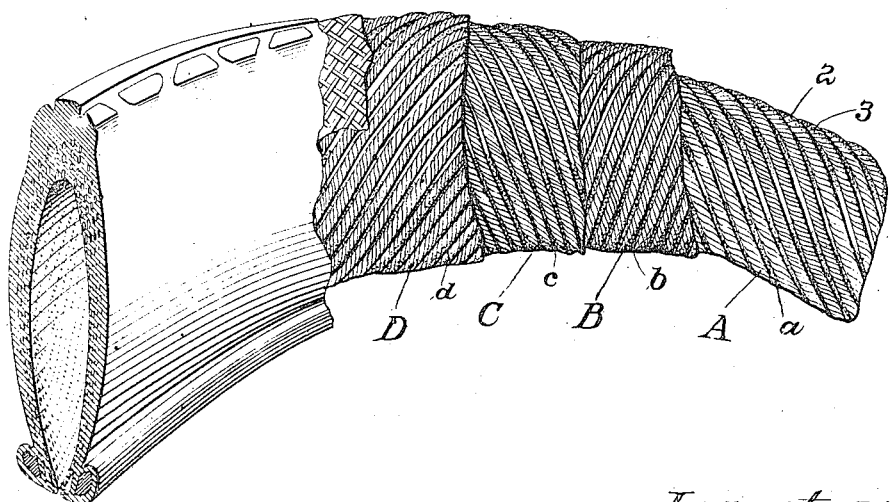

Further objects of the invention will be apparent from the following specification and the accompanying drawings in which:

Figure 1 is a transverse sectional view of a tire casing constructed according to the present invention. Fig. 2 is a perspective view of a portion of the casing, constructed according to the present invention showing the several plies of which the carcass is composed. Fig. 3 is an enlarged detail of one cord. Fig. 4 is a plan view of the ring illustrating the manner in which the cord plies are wound thereon.

Referring now to the drawings, the cord carcass is formed on a circular ring core 1 and the initial step of the building process consists in applying to this member a layer or coat of rubber $a$. The cord 2 used consists of a rubber treated, twisted cord composed of three, four or five, preferably four strands or threads 3 which are tightly twisted together so as to be in intimate contact with one another, there being no special provision made for a central core of any kind, and there being no resultant hollow central bore. The cord 2 is much smaller in diameter than the hollow cord previously employed in the construction of tire casings and the selection of a smaller sized cord is considered an important point in the present method. The first ply of cord A is wound onto the ring core 1 by a suitable winding machine, the cord being wrapped spirally around the core so as to form, say, six complete convolutions. As the cords 2 are wound onto the ring core they embed themselves into the rubber envelop $a$ thereon. The cords 2 of the ply A are laid on the core 1 at a definite angle to the circumferential surface of the core and are further placed in definite relation one to another. Thus whereas the adjacent cores 2 are nearly in contact along the inner circumference of the ring core, they are considerably spaced apart along the outer circumference or in that portion of their lengths which is disposed at the apex or tread part of the casing. This regulation of the spaces between the individual cords is accomplished by a specially designed machine, which forms the subject matter of a co-pending application. The degree of variance between the spaces at the outer and inner circumferences is not an arbitrary one and its purpose is clearly to increase the flexible quality of the fabric formed. After a complete ply A of cords 2 has been entirely wound about the ring core and embedded in the rubber $a$, a second coating of rubber $b$ is applied to the outer surface of the ply A and a second cord ply B is then wrapped and embedded in this second rubber envelop. The cords of the second ply B are laid at a reverse angle to those of the first layer A. The steps of the process are thus repeated, a third coating of rubber $c$ being applied over the ply B, and a third ply C of cords 2 being wrapped into the rubber and so on until a structure is built having four superimposed plies A, B, C and D of cords 2, the alternate layers or plies having the cords arranged at reverse angles in respect to one another.

It will be noted that in each of the several plies A, B, C and D, the individual cords 2 are spaced apart at regular predetermined intervals at and near the tread portion of the carcass and that the intervening spaces are filled with the rubber of the several layers of coating $a$, $b$, $c$ and $d$. This virtually amounts to the formation of four separate and distinct tubular sheets of cord fabric having incorporated in each sheet unwoven twisted cords running in spiral convolutions throughout the sheets and having alternate strips of rubber between the cords.

After the cord carcass has been completed, the same may be slit circumferentially along its inner periphery and removed from the ring core to another upon which the casing is finished by the addition of the side strips, bead core, breaker strip and tread proper. The whole is then placed in a mold and vulcanized under suitable pressure.

In constructing this particular kind of cord tire a non-skid tread is used which is peculiarly suited to the characteristics of the cord carcass and is adapted to expand and contract with the tire casing under normal usage, thus greatly increasing the general flexibility and also the life of the tire. The construction of this tread will not be herein set forth in detail as it forms the subject matter of another application.

By forming a cord tire of several superimposed plies of small solid, twisted rubber-treated cords embedded in rubber, a yieldable structure is obtained which possesses greater flexibility and resiliency than has heretofore been known could exist in a tire of this kind. Instead of the individual cords of one ply being crowded and jammed together at the tread portion of the tire, as was the case with the flattened hollow cords, the various cords of one ply are here separated by intervening strips of rubber, the result being that when a stone is struck in the road the cords are permitted to turn slightly in the fabric, the rubber allowing a certain definite "give" and serving also to return them to their original position. By examining the cross section, Fig. 1, it will be seen that the cords of the several superimposed layers bear a staggered relation one to another, there being no open spaces through which a sharp pointed obstacle could penetrate to the inner inflatable tube.

Having thus described my invention what I claim is:

1. The process of making tire casings consisting of first forming a cord carcass by winding spirally about an annular former covered with a rubber envelop, a twisted rubber impregnated cord so as to embed the cord in the rubber envelop, the cord being so wound as to leave definite intervals of rubber between the spiral convolutions at the tread portions of the casing, then slitting the carcass along its inner periphery, inserting bead cores, adding side and tread portions and vulcanizing the whole to produce a finished casing.

2. The process of making tire casings consisting of first forming a cord carcass by winding spirally about an annular former covered with a rubber envelop, a plurality of plies of twisted rubber impregnated cord, the several plies being laid one upon another with layers or envelops of rubber interposed between, the cords of the several plies being arranged in reverse angles to each other, and the individual cords of each ply being definitely spaced apart in that part of their length disposed at the tread portion of the casing, then slitting the carcass along its inner periphery, inserting bead cores, adding side and tread portions and vulcanizing the whole to produce a finished casing.

3. The process of making tire casings consisting of first forming a cord carcass by winding spirally about an annular former covered with a rubber envelop, a twisted rubber impregnated coreless cord, so as to embed the cord in the rubber envelop, the cord being wound so as to leave spaced intervals of rubber between the cords at the tread portion of the casing, then slitting the carcass along its inner periphery, inserting bead cores, adding side and tread portions and vulcanizing the whole to produce a finished casing.

4. The process of making tire casings consisting of first forming a cord carcass by winding spirally about an annular former covered with a rubber envelop a twisted rubber impregnated cord of sufficiently small diameter to embed itself in the rubber envelop, the cord being wound so as to leave spaced intervals of rubber between the cords at the tread portion of the casing, then slitting the carcass along its inner periphery, inserting bead cores, adding side and tread portions and vulcanizing the whole to produce a finished casing.

WALTER R. DENMAN.

Witnesses:
C. A. WOLF,
J. H. O'HARA.

Copies of this patent may be obtained for five cents each, by addressing the "Commissioner of Patents, Washington, D. C."